US007628068B2

(12) United States Patent
Bessette

(10) Patent No.: US 7,628,068 B2
(45) Date of Patent: Dec. 8, 2009

(54) CASE, WINDOW AND GASKET FOR MEASURING DEVICE

(75) Inventor: Tyler Jon Bessette, Mildford, CT (US)

(73) Assignee: Ashcroft, Inc., Stratford, CT (US)

( * ) Notice: Subject to any disclaimer, the term of this patent is extended or adjusted under 35 U.S.C. 154(b) by 226 days.

(21) Appl. No.: 11/923,135

(22) Filed: Oct. 24, 2007

(65) Prior Publication Data

US 2009/0107235 A1    Apr. 30, 2009

(51) Int. Cl.
  *G01D 11/24*   (2006.01)
  *G01L 19/14*   (2006.01)
  *G01P 1/02*    (2006.01)
  *B65B 7/28*    (2006.01)
  *B65D 6/40*    (2006.01)
  *B65D 53/00*   (2006.01)
  *B65D 41/00*   (2006.01)
  *B65D 45/32*   (2006.01)

(52) U.S. Cl. .................. 73/431; 220/200; 220/240; 220/309.1; 220/310.1; 220/319

(58) Field of Classification Search .............. 73/431; 220/200, 240, 309.1, 310.1, 319
See application file for complete search history.

(56) References Cited

U.S. PATENT DOCUMENTS

| 3,434,330 | A | * | 3/1969 | Ingham et al. ............... 73/1.88 |
| 3,504,551 | A | * | 4/1970 | Bohenek ..................... 73/431 |
| 4,092,866 | A | | 6/1978 | Miele, Jr. et al. |
| 4,137,771 | A | | 2/1979 | Young et al. |
| 4,347,744 | A | | 9/1982 | Buchanan |
| 4,753,112 | A | | 6/1988 | Wetterhorn |
| 5,913,447 | A | | 6/1999 | Carpenter |
| 6,679,122 | B2 | | 1/2004 | Blake et al. |
| 7,066,644 | B2 | | 6/2006 | Padgett |

OTHER PUBLICATIONS

International Search Report dated Dec. 23, 2008 (2 pages).

* cited by examiner

*Primary Examiner*—David A. Rogers
*Assistant Examiner*—Nathaniel Kolb
(74) *Attorney, Agent, or Firm*—McCarter & English, LLP

(57) ABSTRACT

The present disclosure provides for systems and methods for fabricating measuring devices, e.g., a pressure gauge, thermometer or the like. More particularly, the present disclosure provides for systems and methods for fabricating measuring device assemblies having at least a case, window and gasket, where the measuring device may be assembled in multiple different ways using the same case, window and gasket.

20 Claims, 6 Drawing Sheets

CASE, WINDOW AND GASKET FOR MEASURING DEVICE

BACKGROUND

1. Technical Field

The present disclosure relates to a measuring device assembly and method for fabricating measuring device assemblies and, more particularly, to a method for fabricating measuring device assemblies having at least a case, window and gasket, where the measuring device may be assembled in multiple different ways using the same case, window and gasket.

2. Background Art

Measuring devices, such as instruments and gauges used for measuring temperature and pressure, have innumerable uses in industry. For example, pressure gauges to measure the pressure of process media are well known. Pressure gauges are useful in a myriad of different environments for commercial and industrial applications. Typically, pressure gauges measure pressure and provide an indication of the value. Pressure values are usually displayed in analog form (e.g., by a pointer) or in digital form (e.g., by an electronic readout).

Price competition between the various measuring device manufacturers is a factor in the marketplace. Therefore, a savings in the cost of material, labor and the like by a manufacturer can have a significant effect on that manufacturer's sales, market share and margins. Therefore, a constant need exists among these manufacturers to develop more cost effective manufacturing techniques.

In general, the actual operating elements of the measuring device are typically supported in a support structure. One of the most typical support structures is a cylindrical case which supports the measuring device within the case. In addition, measuring devices are generally enclosed and protected by a window over the face of the measuring device to be protected. Some manufacturers produce measuring devices with various window sizes, and with various materials. For example, sometimes a ring is mounted at one end of the case for supporting a window so that the readout of the measuring device can be seen. Sometimes there is a gasket or gasket material adjacent to and/or around the window in order to seal the window to the case and attempt to make the measuring device leak tight.

Some measuring devices have a removable ring on the front of the measuring device, where the removable ring is used to hold the window in place, and where the ring may be easily removed by a user to give the user access to the internals of the measuring device. Other measuring devices have a non-removable, tamper-resistant ring on the front of the measuring device, where the non-removable ring is used to hold the window in place. In addition, some measuring devices do not include a ring to hold the window in place.

These design and manufacturing differences have a significant impact on the manufacturing process and the cost of inventory. To satisfy customer requirements and to allow the manufacturer to offer several assembly options, the typical measuring device manufacturer has been required to maintain an inventory of several different types of measuring device parts. For example, typically unique parts (e.g., cases, rings, windows, gaskets, etc.) are required for each desired type of measuring device assembly (e.g., removable ring, non-removable ring, no ring, etc.), thereby requiring the manufacturer to maintain an inventory of several different types of measuring device parts. This inventory requirement is inefficient and costly. In addition, manufacturer confusion caused by having different parts for each desired type of measuring device assembly also adds to manufacturing inefficiencies and increased costs.

These and other inefficiencies and opportunities for improvement are addressed and/or overcome by the systems and methods of the present disclosure.

SUMMARY

The present disclosure provides an advantageous measuring device assembly and method for fabricating advantageous measuring device assemblies. In exemplary embodiments, the present disclosure provides for improved systems and methods for fabricating measuring device assemblies (e.g., a pressure gauge, thermometer or the like) having at least a case, window and gasket, where the measuring device may be assembled in multiple different ways using the same case, window and gasket.

The present disclosure provides for a measuring device system including a case of a first measuring device that includes at least three projections and at least three case protrusions; a window of the first measuring device that includes: (i) at least three clearance notches; (ii) at least three window protrusions; and (iii) a groove, wherein the groove further includes a bottom lip; a gasketing material sized to rest in the groove; wherein the at least three clearance notches are configured and dimensioned to allow the at least three projections to bypass the at least three clearance notches when the at least three clearance notches are aligned with the at least three projections during assembly of the window to the case; wherein the at least three projections are configured and dimensioned to snap-fit over the bottom lip of the groove associated with the window to secure the window to the case when the at least three clearance notches are not aligned with the at least three projections during assembly of the window to the case; wherein the at least three window protrusions are configured and dimensioned to align with and rest against the at least three case protrusions and define at least three clearance regions around the front side of the measuring device when the at least three clearance notches are aligned with the at least three projections during assembly of the window to the case; and wherein the at least three window protrusions are configured and dimensioned to allow each one of the at least three window protrusions to be positioned between two adjacent case protrusions to form a round front face to the first measuring device when the at least three clearance notches are not aligned with the at least three projections during assembly of the window to the case.

The present disclosure also provides for a measuring device system wherein the first measuring device is a pressure measuring device. The present disclosure also provides for a measuring device system wherein the first measuring device is a temperature measuring device.

The present disclosure also provides for a measuring device system wherein the gasketing material is an O-ring, and wherein the O-ring forms a radial style seal between the window and the case after assembling the window to the case.

The present disclosure also provides for a measuring device system further including a removable ring that includes at least three mating structures; and wherein the at least three mating structures of the removable ring are releasably secured to the at least three case protrusions of the case to releasably secure the removable ring to the case and to seal the window between the removable ring and the case. The present disclosure also provides for a measuring device system wherein the at least three mating structures are ramped mating structures.

The present disclosure also provides for a measuring device system wherein the window is a plastic molded window. The present disclosure also provides for a measuring device system further including a retaining ring, and wherein the retaining ring is fixedly secured onto the case to seal the window between the retaining ring and the case. The present disclosure also provides for a measuring device system wherein the retaining ring is fixedly secured onto the case by crimping or rolling the back end of the retaining ring over the case.

The present disclosure also provides for a measuring device system wherein the at least three projections are snap-fit over the bottom lip of the groove associated with the window to secure the window to the case after assembling the window to the case; and wherein each one of the at least three window protrusions are positioned between two adjacent case protrusions to form a round front face to the first measuring device after assembling the window to the case.

The present disclosure also provides for a method for manufacturing a measuring device system including providing a case of a first measuring device that includes at least three projections and at least three case protrusions; providing a window of the first measuring device that includes: (i) at least three clearance notches; (ii) at least three window protrusions; and (iii) a groove, wherein the groove further includes a bottom lip; wherein the at least three clearance notches are configured and dimensioned to allow the at least three projections to bypass the at least three clearance notches when the at least three clearance notches are aligned with the at least three projections during assembly of the window to the case; wherein the at least three projections are configured and dimensioned to snap-fit over the bottom lip of the groove associated with the window to secure the window to the case when the at least three clearance notches are not aligned with the at least three projections during assembly of the window to the case; wherein the at least three window protrusions are configured and dimensioned to align with and rest against the at least three case protrusions and define at least three clearance regions around the front side of the measuring device when the at least three clearance notches are aligned with the at least three projections during assembly of the window to the case; wherein the at least three window protrusions are configured and dimensioned to allow each one of the at least three window protrusions to be positioned between two adjacent case protrusions to form a round front face to the first measuring device when the at least three clearance notches are not aligned with the at least three projections during assembly of the window to the case; providing a gasketing material sized to rest in the groove; resting the gasketing material in the groove; and assembling the window to the case.

The present disclosure also provides for a method for manufacturing a measuring device system wherein the first measuring device is a pressure measuring device. The present disclosure also provides for a method for manufacturing a measuring device system wherein the first measuring device is a temperature measuring device.

The present disclosure also provides for a method for manufacturing a measuring device system wherein the gasketing material is an O-ring, and wherein the O-ring forms a radial style seal between the window and the case after assembling the window to the case.

The present disclosure also provides for a method for manufacturing a measuring device system further including providing a removable ring that includes at least three mating structures; and wherein the at least three mating structures of the removable ring are releasably secured to the at least three case protrusions of the case to releasably secure the removable ring to the case and to seal the window between the removable ring and the case. The present disclosure also provides for a method for manufacturing a measuring device system wherein the at least three mating structures are ramped mating structures.

The present disclosure also provides for a method for manufacturing a measuring device system wherein the window is a plastic molded window. The present disclosure also provides for a method for manufacturing a measuring device system further including providing a retaining ring, and wherein the retaining ring is fixedly secured onto the case to seal the window between the retaining ring and the case. The present disclosure also provides for a method for manufacturing a measuring device system wherein the retaining ring is fixedly secured onto the case by crimping or rolling the back end of the retaining ring over the case.

The present disclosure also provides for a method for manufacturing a measuring device system wherein the at least three projections are snap-fit over the bottom lip of the groove associated with the window to secure the window to the case after assembling the window to the case; and wherein each one of the at least three window protrusions are positioned between two adjacent case protrusions to form a round front face to the first measuring device after assembling the window to the case.

Additional advantageous features, functions and applications of the disclosed systems and methods of the present disclosure will be apparent from the description which follows, particularly when read in conjunction with the appended figures.

BRIEF DESCRIPTION OF THE DRAWINGS

To assist those of ordinary skill in the art in making and using the disclosed systems and methods, reference is made to the appended figures, wherein.

DETAILED DESCRIPTION

Figure 1:
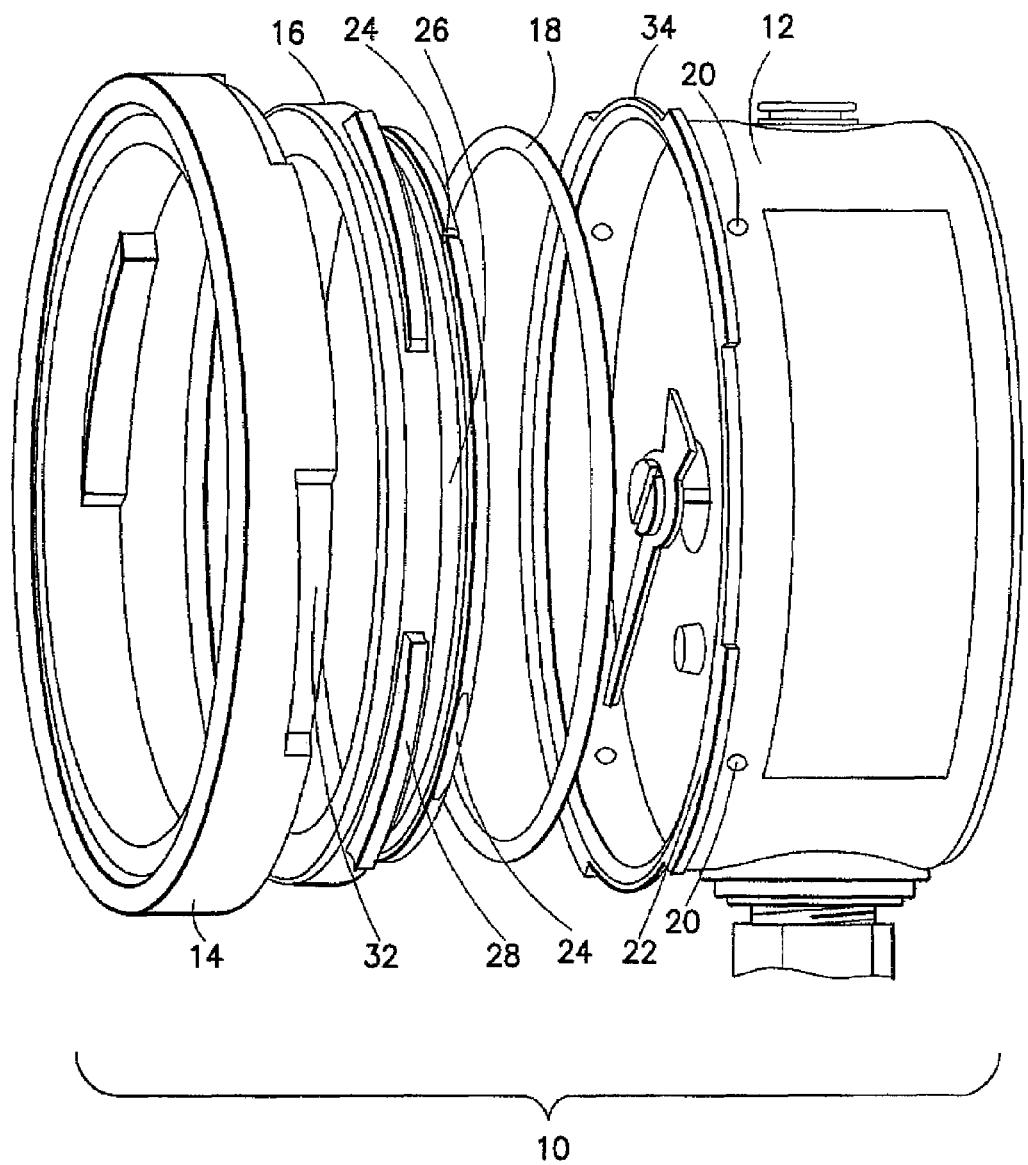
FIG. 1 is a perspective view of an embodiment of a measuring device according to the present disclosure, before assembly.

In the description which follows, like parts are marked throughout the specification and drawings with the same reference numerals, respectively. Drawing figures are not necessarily to scale and in certain views, parts may have been exaggerated for purposes of clarity.

The present disclosure provides for systems and methods for fabricating measuring devices, e.g., a pressure gauge, thermometer or the like. More particularly, the present disclosure provides for improved systems and methods for fabricating measuring device assemblies having at least a case, window and gasket, where the measuring device may be assembled in multiple different ways using the same case, window and gasket. Current practice provides for the risk that the typical measuring device manufacturer may be required to maintain an inventory of several different types of measuring device parts (e.g., cases, rings, windows, gaskets, etc.) in order to satisfy customer requirements and to allow the manufacturer the ability to offer several assembly options (e.g., removable ring, non-removable ring, no ring, etc.). This inventory requirement is confusing, inefficient and costly. In exemplary embodiments, the present disclosure provides for improved systems and methods for fabricating measuring device assemblies having at least a case, window and gasket, where the measuring device may be assembled in multiple different ways using the same case, window and gasket, thereby reducing the cost of manufacture and reducing the inventory requirements of manufacturers and suppliers and providing a significant commercial advantage as a result.

Figure 2:
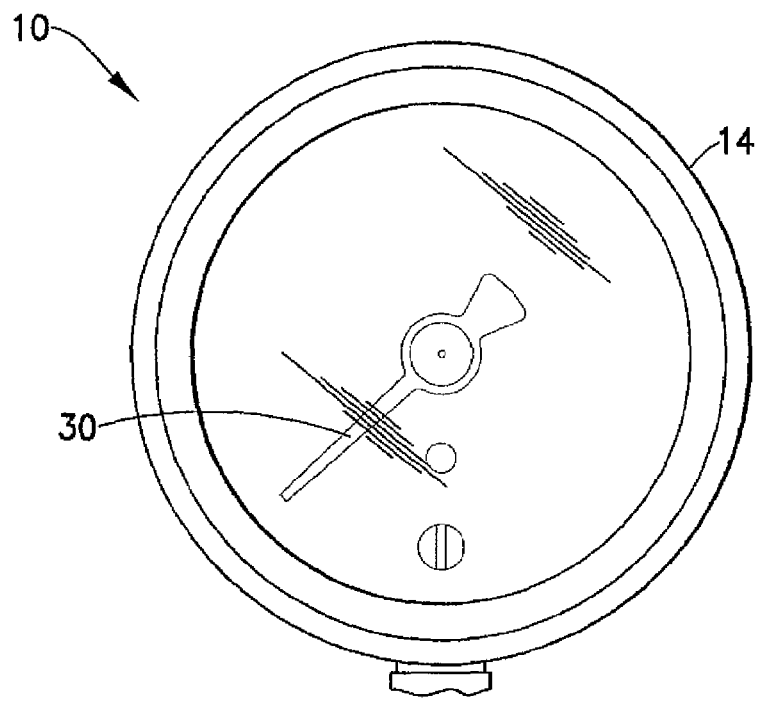
FIG. 2 is a frontal view of an embodiment of a measuring device according to the present disclosure, after assembly.
Figure 3:
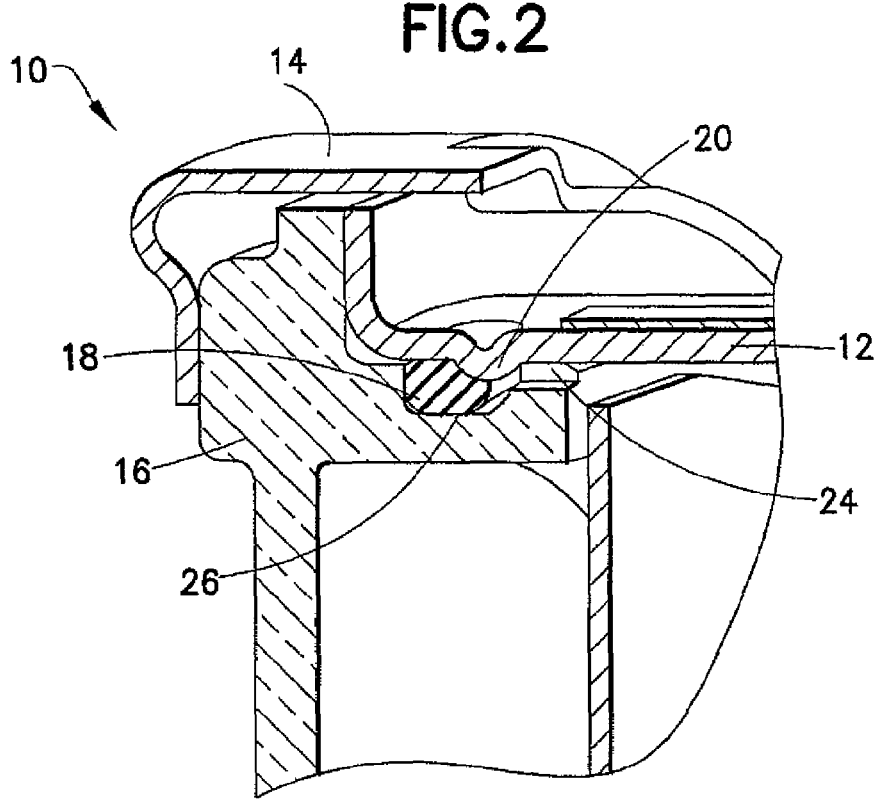
FIG. 3 is a partial cross-sectional view of an embodiment of a measuring device according to the present disclosure, after assembly.

Referring now to the drawings, and in particular to FIGS. 1-3, there is illustrated a measuring device 10 depicting an embodiment of the present disclosure. For example, measuring device 10 may be a pressure measuring device, including, but not limited to, a pressure gauge, a pressure transducer or the like. In another embodiment, measuring device 10 is a temperature measuring device. However, pressure or temperature measuring devices are not the only measuring devices that could be used in accordance with the principles of the present disclosure, as will be readily apparent to persons skilled in the art from the description provided herein.

Figure 5:
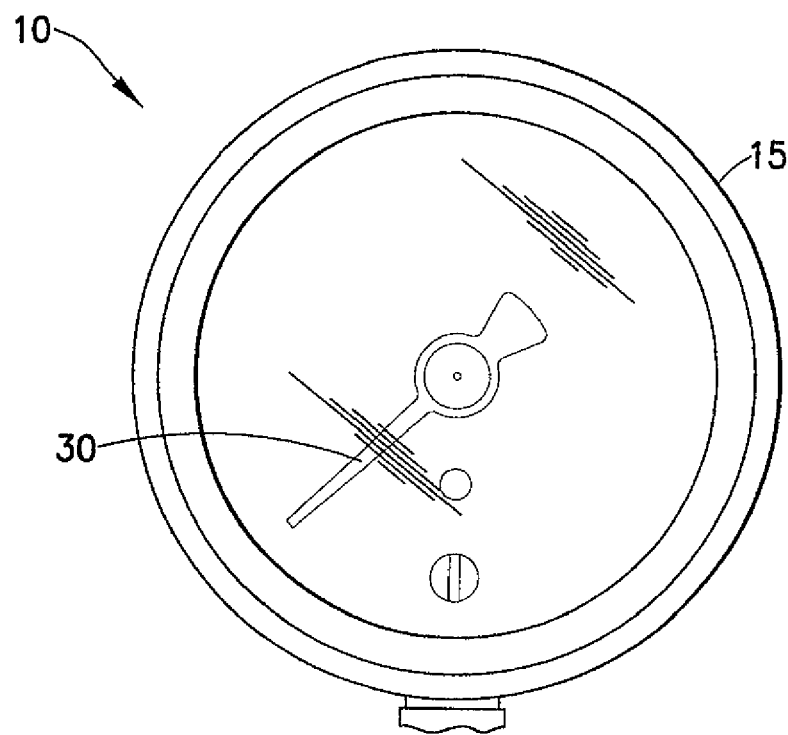
FIG. 5 is a frontal view of another embodiment of a measuring device according to the present disclosure, after assembly.
Figure 8:
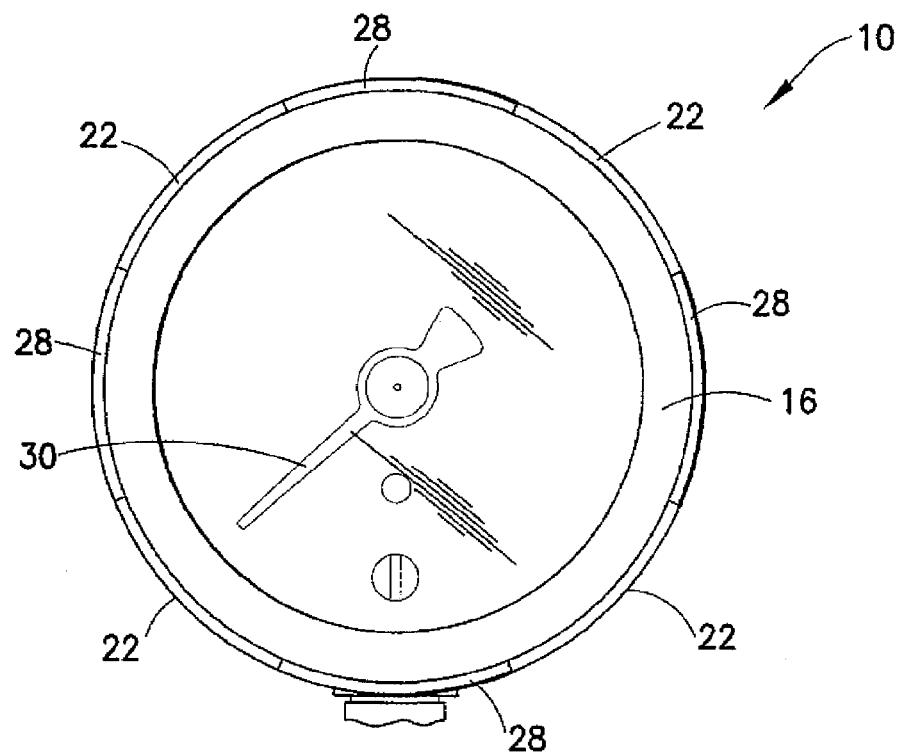
FIG. 8 is a frontal view of another embodiment of a measuring device according to the present disclosure, after assembly.

For example, measuring device 10 may be coupled to a container such as a tank, a pipe, a pressurized reactor or the like from which (or for which) measurements are to be obtained. The measuring device 10 allows a condition to be measured, whether it be temperature, pressure or some other value, to be measured by a measuring device mechanism, such as, for example, a Bourden tube or the like. In exemplary embodiments and as shown in FIGS. 2, 5 and 8, an indicator 30 is mounted on the measuring device 10, typically for rotation about the central axis of the measuring device 10 to an angular position representative of the value measured by the measuring device, whether it be pressure, temperature or some other condition. The actual elements of the measuring device mechanism are not shown as they are conventional and do not form a unique aspect of the present disclosure.

Figure 4:
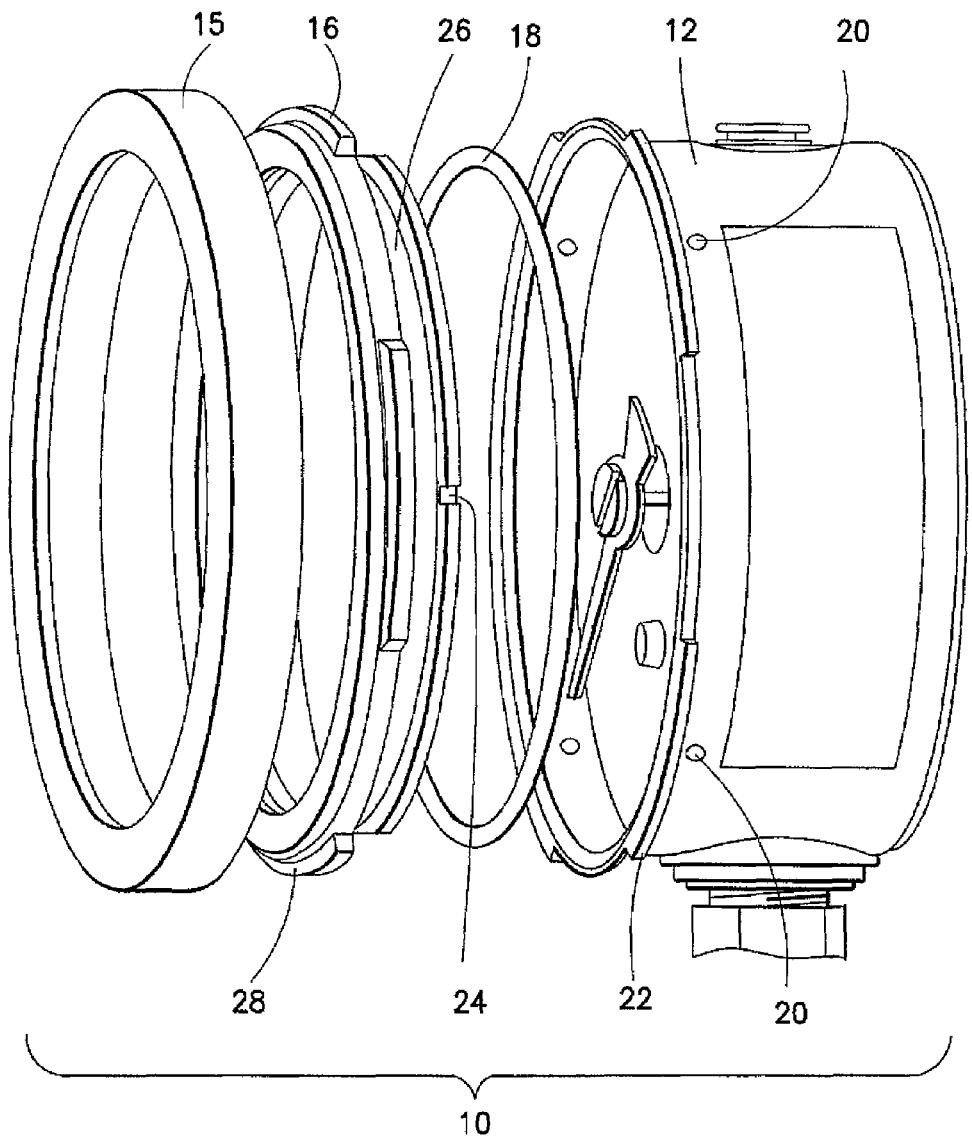
FIG. 4 is a perspective view of another embodiment of a measuring device according to the present disclosure, before assembly.
Figure 7:
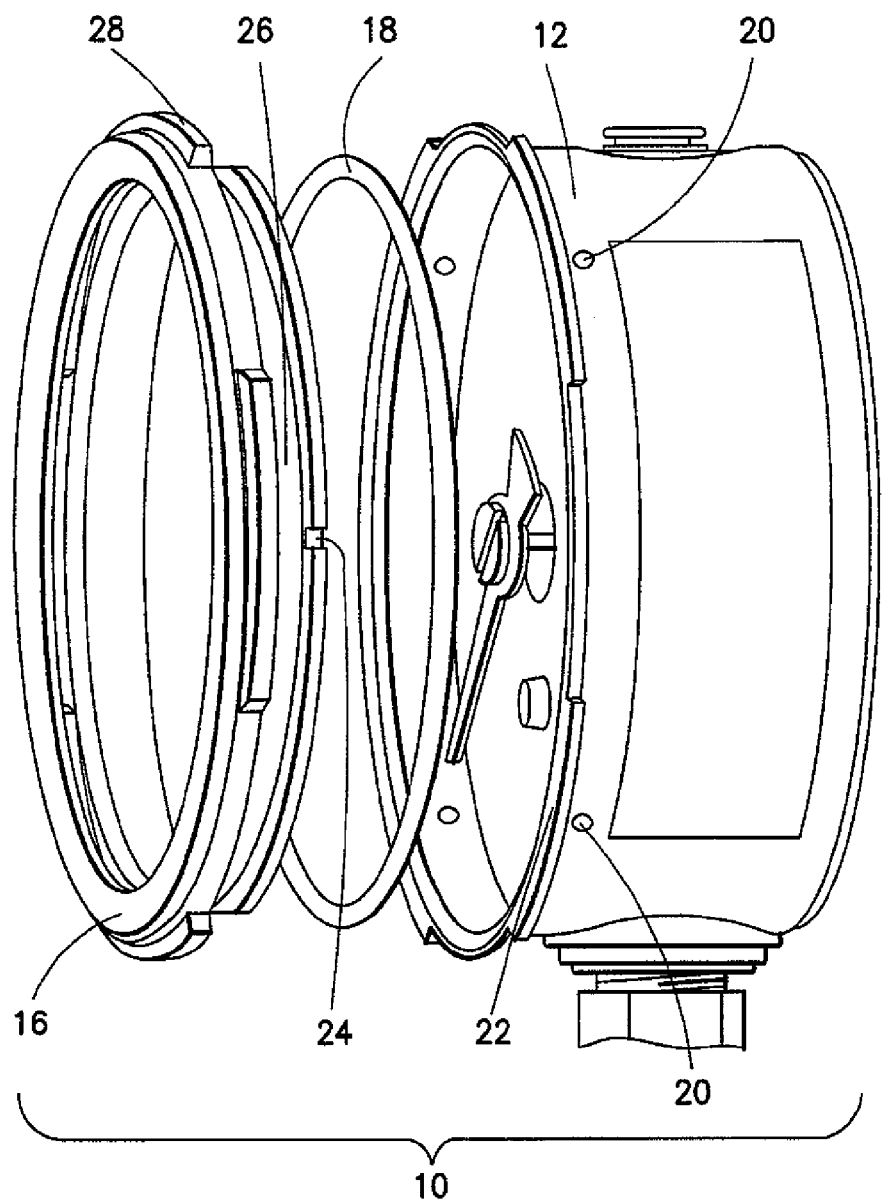
FIG. 7 is a perspective view of another embodiment of a measuring device according to the present disclosure, before assembly.

In exemplary embodiments and as shown in FIGS. 1, 4 and 7, there is depicted a measuring device 10 prior to assembly having a case 12, a window 16, and a gasketing material 18. In general, case 12 is configured and dimensioned to house and protect the measuring device mechanism of measuring device 10. In one embodiment, case 12 is cylindrical. As depicted in FIGS. 1, 4 and 7, case 12 further includes at least three projections 20. In one embodiment, the at least three projections 20 of case 12 are positioned adjacent to or near the front side of case 12. The at least three projections 20 of case 12 may take the form of bumps, although the present disclosure is not limited thereto. Rather, the at least three projections 20 may take a variety of forms, including without limitation, knobs, protuberances or the like.

In an exemplary embodiment, each of the at least three projections 20 are spaced apart from each adjacent projection 20 around the front side of case 12. In one embodiment, each of the at least three projections 20 are spaced equidistantly apart from each adjacent projection 20. In exemplary embodiments and as shown in FIGS. 1, 4 and 7, case 12 of measuring device 10 includes four projections 20, with each of the four projections 20 spaced equidistantly apart from each adjacent projection 20. In an alternative embodiment, each of the at least three projections 20 are spaced non-equidistantly apart from each adjacent projection 20.

As depicted in FIGS. 1, 4 and 7, case 12 further includes at least three case protrusions 22. In one embodiment, the at least three case protrusions 22 of case 12 are positioned around the perimeter of case 12, at or near the front side of case 12.

In exemplary embodiments and as depicted in FIGS. 1, 4 and 7, each of the at least three case protrusions 22 are spaced apart from each adjacent case protrusion 22 around the perimeter of case 12, at or near the front side of case 12. In one embodiment, each of the at least three case protrusions 22 are spaced equidistantly apart from each adjacent case protrusion 22. In exemplary embodiments and as shown in FIGS. 1, 4 and 7, case 12 of measuring device 10 includes four case protrusions 22, with each of the four case protrusions 22 spaced equidistantly apart from each adjacent case protrusion 22 around the perimeter of case 12, at or near the front side of case 12. In an alternative embodiment, each of the at least three case protrusions 22 are spaced non-equidistantly apart from each adjacent case protrusion 22.

With reference to FIGS. 1, 4 and 7, measuring device 10 includes a window 16. Exemplary window 16 takes the form of a plastic molded window, although the present disclosure is not limited thereto. Rather, window 16 may take a variety of forms, including without limitation, a glass window, a safety glass window, a tempered glass window, a planar glass window or the like. As depicted in FIGS. 1, 4 and 7, window 16 further includes a groove 26. In an exemplary embodiment, groove 26 is located in the outer edge of window 16. In one embodiment, groove 26 extends around the entire outer perimeter of window 16, and is configured and dimensioned to allow a gasketing material 18 to rest in the groove 26 of window 16. In exemplary embodiments and as depicted in FIGS. 1, 4 and 7, gasketing material 18 is an O-ring. In one embodiment, gasketing material 18 is an elastomeric O-ring. In exemplary embodiments and as shown in FIGS. 1, 3, 4, 7 and 9, when the window 16 is assembled onto case 12 of the measuring device 10, the gasketing material 18 forms a radial style seal between the window 16 and the case 12 to make the measuring device 10 leak tight after assembly. In an alternative embodiment, gasketing material 18 is a flat face gasketing material.

As depicted in FIGS. 1, 4 and 7, window 16 further includes at least three window protrusions 28. In one embodiment, the at least three window protrusions 28 of window 16 are positioned around the perimeter of window 16, at or near the front side of window 16. In exemplary embodiments and as depicted in FIGS. 1, 4 and 7, each of the at least three window protrusions 28 are spaced apart from each adjacent window protrusion 28 around the perimeter of window 16, at or near the front side of window 16. In one embodiment, each of the at least three window protrusions 28 are spaced equidistantly apart from each adjacent window protrusion 28. In exemplary embodiments and as shown in FIGS. 1, 4 and 7, window 16 of measuring device 10 includes four window protrusions 28, with each of the four window protrusions 28 spaced equidistantly apart from each adjacent window protrusion 28 around the perimeter of window 16, at or near the front side of window 16. In an alternative embodiment, each of the at least three window protrusions 28 are spaced non-equidistantly apart from each adjacent window protrusion 28.

As shown in FIGS. 1, 4 and 7, window 16 further includes at least three clearance notches 24. In one embodiment, the at least three clearance notches 24 of window 16 are positioned around the perimeter of window 16 and adjacent to or near the back side of window 16. In an exemplary embodiment, each of the at least three clearance notches 24 are spaced apart from each adjacent clearance notch 24. In one embodiment, each of the at least three clearance notches 24 are spaced equidistantly apart from each adjacent clearance notch 24. In exemplary embodiments and as shown in FIGS. 1, 4 and 7, window 16 of measuring device 10 includes four clearance notches 24, with each of the four clearance notches 24 spaced equidistantly apart from each adjacent clearance notch 24. In an alternative embodiment, each of the at least three clearance notches 24 are spaced non-equidistantly apart from each adjacent clearance notch 24.

In one embodiment and as shown in FIGS. 1 and 3, each of the at least three clearance notches 24 are positioned around the perimeter of window 16 so that each one of the at least three projections 20 of case 12 may align with and may bypass one of the at least three clearance notches 24 of window 16 when window 16 is assembled onto case 12. In an exemplary embodiment and as shown in FIG. 1, window 16 of measuring device 10 includes four clearance notches 24, and each of the four clearance notches 24 are positioned around the perimeter of window 16 so that each one of the four projections 20 of case 12 may align with and may bypass one of the four clearance notches 24 of window 16 when window 16 is assembled onto case 12.

In one embodiment of the present disclosure, by aligning each of the at least three clearance notches 24 with one of the at least three projections 20, this ensures that the window 16 can be pushed on or off of the case 12 with little effort when assembling or disassembling the measuring device 10, as the at least three clearance notches 24 may be positioned and configured to not impede the at least three projections 20 during the addition or removal of the window 16 to or from the case 16. In an exemplary embodiment and as shown in FIG. 1, window 16 of measuring device 10 includes four clearance notches 24, and by aligning each of the four clearance notches 24 with one of the four projections 20, this ensures that the window 16 can be pushed on or off of the case 12 with little effort when assembling or disassembling the measuring device 10.

In addition, in one embodiment of the present disclosure and as shown in FIG. 1, when the at least three clearance notches 24 are aligned with the at least three projections 20 and the window 16 is assembled onto the case 12, each one of the at least three case protrusions 22 also align with and rest against one of the at least three window protrusions 28 of window 16. In an exemplary embodiment and as shown in FIG. 1, measuring device 10 includes four clearance notches 24, four projections 20, four case protrusions 22 and four window protrusions 22, and when the four clearance notches 24 are aligned with the four projections 20 and the window 16 is assembled onto case 12, the four case protrusions 22 also align with and rest against the four window protrusions 28 of window 16.

In one embodiment, the alignment of the at least three clearance notches 24 with the at least three projections 20 ensures that the at least three case protrusions 22 are aligned with the at least three window protrusions 28, as the measuring device assembler will have the ability to feel if the clearance notches 24 are aligned with the projections 20. In an exemplary embodiment and as shown in FIG. 1, measuring device 10 includes four clearance notches 24, four projections 20, four case protrusions 22 and four window protrusions 22, and the alignment of the four clearance notches 24 with the four projections 20 ensures that the four case protrusions 22 are aligned with the four window protrusions 28, as the measuring device assembler will have the ability to feel if the four clearance notches 24 are aligned with the four projections 20.

In addition, in one embodiment, the alignment of the at least three case protrusions 22 with the at least three window protrusions 28 also ensures that there are at least three clearance regions 34 around the front side of the measuring device 10 after the window 16 is assembled onto the case 12. In one embodiment of the present disclosure and as shown in FIGS. 1-3, the at least three clearance regions 34 allows for the assembly of a removable ring 14 onto measuring device 10. In an exemplary embodiment and as shown in FIG. 1, measuring device 10 includes four clearance notches 24, four projections 20, four case protrusions 22 and four window protrusions 28, and the alignment of the four case protrusions 22 with the four window protrusions 28 also ensures that there are four clearance regions 34 around the front side of the measuring device 10 after the window 16 is assembled to the case 12. In an exemplary embodiment and as shown in FIG. 1, the four clearance regions 34 allows for the assembly of a removable ring 14 onto measuring device 10.

In one embodiment of the present disclosure and as shown in FIGS. 1-3, measuring device 10 may further include a removable ring 14. Removable ring 14 includes at least three mating structures 32. In one embodiment, the at least three mating structures 32 are positioned adjacent to or near the back side of removable ring 14. The at least three mating structures 32 may take the form of ramped mating structures, although the present disclosure is not limited thereto. Rather, the at least three mating structures 32 may take a variety of forms.

In one embodiment and as shown in FIG. 1, each of the at least three mating structures 32 are spaced apart from each adjacent mating structure 32. In one embodiment, each of the at least three mating structures 32 are spaced equidistantly apart from each adjacent mating structure 32. In an exemplary embodiment and as shown in FIG. 1, removable ring 14 includes four mating structures 32, with each of the four mating structures 32 spaced equidistantly apart from each adjacent mating structure 32. In an alternative embodiment, each of the at least three mating structures 32 are spaced non-equidistantly apart from each adjacent mating structure 32.

In one embodiment of the present disclosure and as shown in FIGS. 1-3, when the at least three clearance notches 24 are aligned with the at least three projections 20 and the window 16 is assembled onto case 12, and the at least three case protrusions 22 are aligned with and rest against the at least three window protrusions 28 of window 16 to ensure that there are at least three clearance regions 34 around the front side of measuring device 10 after the window 16 is assembled onto case 12, removable ring 14 with the at least three mating structures 32 may be releasably secured onto the case 12 of measuring device 10 to hold the window 16 securely in place and to seal the window 16 between the removable ring 14 and the case 12.

In one embodiment, after the window 16 is assembled onto the case 12, the removable ring 14 may be placed around the window 16 and case 12 so that each one of the at least three mating structures 32 of removable ring 14 is placed in one of the at least three clearance regions 34, and removable ring 14 may then be releasably secured onto the case 12 of measuring device 10 to hold the window 16 securely in place by rotating the removable ring 14 so that each one of the at least three mating structures 32 may be releasably secured onto one of the at least three sections of the measuring device 10 where one of the at least three case protrusions 22 are aligned with and are resting against one of the at least three window protrusions 28. After removable ring 14 is releasably secured onto the measuring device 10 to hold the window 16 securely in place, removable ring 14 may be removed from the measuring device 10 by rotating the removable ring 14 so that each one of the at least three mating structures 32 are released from the measuring device 10. Window 16 can then be pushed off of the case 12 with little effort when disassembling the measuring device 10, for example, to give a user access to the internals of the measuring device 10 and/or to the measuring device mechanism (e.g., during repair or maintenance work).

In an exemplary embodiment and as shown in FIG. 1, measuring device 10 includes four clearance notches 24, four projections 20, four case protrusions 22 and four window protrusions 28, and further includes a removable ring 14 having four mating structures 32. In one embodiment and as shown in FIG. 1, when the four clearance notches 24 are aligned with the four projections 20 and the window 16 is assembled onto case 12, and the four case protrusions 22 are aligned with and rest against the four window protrusions 28 of window 16 to ensure that there are four clearance regions 34 around the front side of measuring device 10 after the window 16 is assembled onto case 12, removable ring 14 with the four mating structures 32 may be releasably secured onto the case 12 of measuring device 10 to hold the window 16 securely in place and to seal the window 16 between the removable ring 14 and the case 12.

In one embodiment, after the removable ring 14 is placed around the window 16 and case 12 so that each of the four mating structures 32 of removable ring 14 are placed in one of the four clearance regions 34, removable ring 14 may be releasably secured onto the case 12 of measuring device 10 to hold the window 16 securely in place by rotating the removable ring 14 so that the each one of the four mating structures 32 may be releasably secured onto one of the four sections of the measuring device 10 where one of the four case protrusions 22 are aligned with and are resting against one of the four window protrusions 28. After removable ring 14 is releasably secured onto the measuring device 10 to hold the window 16 securely in place, removable ring 14 may be removed from the measuring device 10 by rotating the removable ring 14 so that each one of the four mating structures 32 are released from the measuring device 10. Window 16 can then be pushed off of the case 12 with little effort when disassembling the measuring device 10, for example, to give a user access to the internals of the measuring device 10 and/or to the measuring device mechanism (e.g., during repair or maintenance work).

In an alternative embodiment, measuring device 10 includes a case 12 having at least three case protrusions 22, at least three projections 20 and a flat face gasketing material (not shown), a planar glass window element (not shown), and a removable ring 14 having at least three mating structures 32. In one embodiment, the planar glass window element is non-circular. In an alternative embodiment, the planar glass window element is circular. When the planar glass window element (not shown) is positioned onto removable ring 14, the planar glass window element (not shown) may be sealed between the removable ring 14 and the flat face gasketing material (not shown) of case 12 when each of the at least three mating structures 32 of the removable ring 14 are releasably secured to one of the at least three case protrusions 22 of the case 12. After removable ring 14 is releasably secured onto the measuring device 10 to hold the planar glass window element securely in place, removable ring 14 and the planar glass window element may be removed from the measuring device 10 by rotating the removable ring 14 so that each one of the at least three mating structures 32 are released from the measuring device 10.

Figure 6:
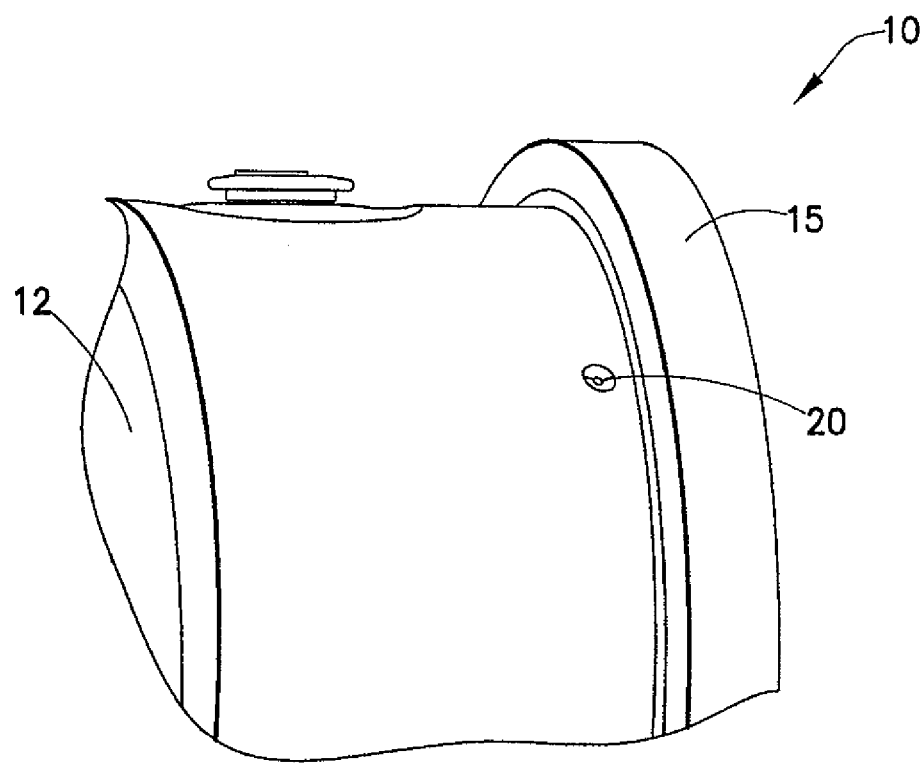
FIG. 6 is a partial cross-sectional view of another embodiment of a measuring device according to the present disclosure, after assembly.

In another alternative embodiment and as shown in FIGS. 4-6, measuring device 10 includes a case 12 having at least three case protrusions 22 and at least three projections 20, a window 16 having a groove 26 and at least three clearance notches 24 and at least three window protrusions 28, a gasketing material 18, and a retaining ring 15. In one embodiment, when the at least three clearance notches 24 are aligned with the at least three projections 20 and the window 16 is assembled onto case 12, retaining ring 15 may be fixedly secured onto the measuring device 10 to hold the window 16 securely in place and to seal the window 16 between the retaining ring 15 and the case 12. In an exemplary embodiment and as shown in FIG. 6, retaining ring 15 may be fixedly secured onto the measuring device 10 to hold the window 16 securely in place by rolling or crimping the back end of the retaining ring 15 over the case 12 of measuring device 10, thereby making the retaining ring 15 a permanent retaining feature for the window 16 and making the measuring device 10 tamper proof.

Figure 9:
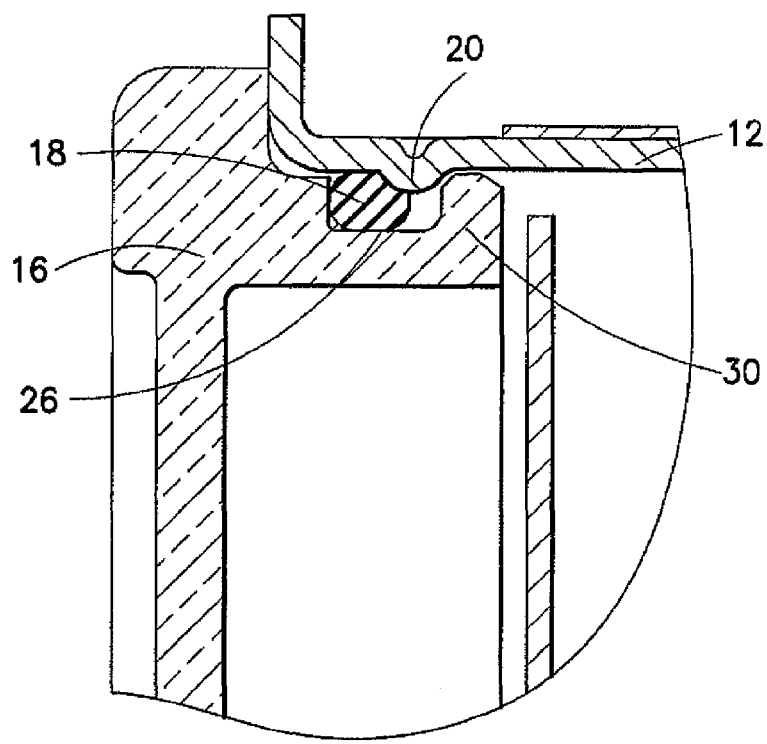
FIG. 9 is a partial cross-sectional view of another embodiment of a measuring device according to the present disclosure, after assembly.

In an alternative embodiment and as shown in FIGS. 4 and 7-9, the window 16 may be rotated prior to assembly onto case 12 so that the at least three clearance notches 24 of window 16 do not align with the at least three projections 20 of case 12. In one embodiment and as shown in FIG. 8, prior to assembly, the window 16 is rotated away from the position where the at least three clearance notches 24 align with the at least three projections 20, so that when the window 16 is assembled onto the case 12, each one of the at least three window protrusions 28 is positioned between two adjacent case protrusions 22, thereby forming a round front face to the assembled measuring device 10. As shown in FIG. 9, after rotating the window 16 prior to assembly onto case 12 so that the at least three clearance notches 24 of window 16 do not align with the at least three projections 20 of case 12, the window 16 may then be assembled onto case 12 by snap-fitting the window 16 onto the case 12, where the at least three projections 20 of case 12 snap-fit over the bottom lip 30 of the groove 26 of window 16, thereby holding the window 16 securely in place on the case 12 of measuring device 10 after assembling the window 16 onto the case 12. As shown in FIG. 9, when the window 16 is assembled onto the case 12 and the at least three projections 20 snap-fit over the bottom lip 30 of the groove 26, the window 16 is securely held in place on the case 12 with the at least three projections 20 positioned in the groove 26 between the gasketing material 18 and the bottom lip 30 of the groove 26. In one embodiment and as shown in FIGS. 4-6, after the window 16 is assembled onto the case 12 with the at least three projections 20 snap-fit over the bottom lip 30 of the groove 26, a retaining ring 15 may be fixedly secured onto the measuring device 10 to additionally hold the window 16 securely in place and to seal the window 16 between the retaining ring 15 and the case 12. In an exemplary embodiment and as shown in FIG. 6, retaining ring 15 may be fixedly secured onto the measuring device 10 to additionally hold the window securely in place by rolling or crimping the back end of the retaining ring over the case 12 of measuring device 10, thereby making the retaining ring 15 a permanent retaining feature for the window 16 and making the measuring device 10 tamper proof. In an alternative embodiment and as shown in FIGS. 7-9, measuring device 10 does not include a retaining ring 15, and the window 16 is held securely in place by the at least three projections 20 being snap-fit over the bottom lip 30 of groove 26, thereby making the measuring device 10 tamper proof.

In an exemplary embodiment and as shown in FIGS. 4 and 7-8, measuring device 10 includes a window 16 having four clearance notches 24 and four window protrusions 28, a gasketing material 18, and a case having four projections 20 and four case protrusions 22. Prior to assembly, the window 16 may be rotated so that the four clearance notches 24 of window 16 do not align with the four projections 20 of case 12. In an exemplary embodiment and as shown in FIGS. 4 and 7-8, the window 16 is rotated 45 degrees from the position where the four clearance notches 24 align with the four projections 20, so that when the window 16 is assembled onto the case 12, each one of the four window protrusions 28 is positioned between two adjacent case protrusions 22, thereby forming a round front face to the assembled measuring device 10. As depicted in FIGS. 7-9, after rotating the window 16 prior to assembly so that the four clearance notches 24 do not align with the four projections 20, the window 16 may then be assembled onto case 12 by snap-fitting the window 16 onto the case 12, where the four projections 20 snap-fit over the bottom lip 30 of the groove 26, thereby holding the window 16 securely in place on the measuring device 10. In one embodiment and as shown in FIGS. 4-6, after the window 16 is assembled onto the case 12 with the four projections 20 snap-fit over the bottom lip 30 of the groove 26, a retaining ring 15 may be fixedly secured onto the measuring device 10 to additionally hold the window 16 securely in place and to seal the window 16 between the retaining ring 15 and the case 12. In an alternative embodiment and as shown in FIGS. 7-9, measuring device 10 does not include a retaining ring 15, and the window 16 is held securely in place by the four projections 20 being snap-fit over the bottom lip 30 of groove 26, thereby making the measuring device 10 tamper proof.

One advantage to at least one embodiment of the present disclosure is that a measuring device manufacturer can offer several different assembly options (e.g., measuring devices having a removable ring, measuring devices having a non-removable ring, measuring devices having no ring) to a customer, while using the same measuring device parts (e.g., cases, windows, gaskets) in each measuring device assembly, which reduces the cost and complexity of manufacture and reduces the inventory requirements, providing a significant commercial advantage as a result. For example, measuring device manufacturers generally are required to use unique parts (e.g., cases, windows, gaskets, etc.) for each type of measuring device assembly (e.g., removable ring, non-removable ring, no ring), thereby requiring the typical manufacturer to maintain an inventory of several different types of measuring device parts. Therefore, since a measuring device assembler can offer several different assembly options while using the same measuring device parts of the present disclosure, this allows a manufacturer to increase the volume of the measuring device parts used, which also reduces the cost of manufacture.

Another advantage to at least one embodiment of the present disclosure is that there are fewer different measuring device parts required for each assembly type (e.g., removable ring, non-removable ring, no ring), which alleviates confusion caused by having different measuring device parts for each assembly type. For example, some measuring device manufacturers may experience confusion caused by having different parts for each desired type of measuring device assembly, which can lead to manufacturing inefficiencies and increased costs. Therefore, since there is generally less manufacturing confusion with the measuring device assemblies of the present disclosure because there are fewer different parts required for each assembly type, this thereby provides a cost and manufacturing advantage as a result.

Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A measuring device system comprising:
   a case of a first measuring device that includes at least three projections and at least three case protrusions;
   a window of the first measuring device that includes: (i) at least three clearance notches; (ii) at least three window protrusions; and (iii) a groove, wherein the groove further includes a bottom lip;
   a gasketing material sized to rest in the groove;
   wherein the at least three clearance notches are configured and dimensioned to allow the at least three projections to bypass the at least three clearance notches when the at least three clearance notches are aligned with the at least three projections during assembly of the window to the case;
   wherein the at least three projections are configured and dimensioned to snap-fit over the bottom lip of the groove associated with the window to secure the window to the case when the at least three clearance notches are not aligned with the at least three projections during assembly of the window to the case;
   wherein the at least three window protrusions are configured and dimensioned to align with and rest against the at least three case protrusions and define at least three clearance regions around the front side of the measuring device when the at least three clearance notches are aligned with the at least three projections during assembly of the window to the case; and
   wherein the at least three window protrusions are configured and dimensioned to allow each one of the at least three window protrusions to be positioned between two adjacent case protrusions to form a round front face to the first measuring device when the at least three clearance notches are not aligned with the at least three projections during assembly of the window to the case.

2. The measuring device system of claim 1, wherein the first measuring device is a pressure measuring device.

3. The measuring device system of claim 1, wherein the first measuring device is a temperature measuring device.

4. The measuring device system of claim 1, wherein the gasketing material is an O-ring, and wherein the O-ring forms a radial style seal between the window and the case after assembling the window to the case.

5. The measuring device system of claim 1 further comprising a removable ring that includes at least three mating structures; and
   wherein the at least three mating structures of the removable ring are releasably secured to the at least three case protrusions of the case to releasably secure the removable ring to the case and to seal the window between the removable ring and the case.

6. The measuring device system of claim 5, wherein the at least three mating structures are ramped mating structures.

7. The measuring device system of claim 1, wherein the window is a plastic molded window.

8. The measuring device system of claim 1 further comprising a retaining ring, and wherein the retaining ring is fixedly secured onto the case to seal the window between the retaining ring and the case.

9. The measuring device system of claim 8, wherein the retaining ring is fixedly secured onto the case by crimping or rolling the back end of the retaining ring over the case.

10. The measuring device system of claim 1, wherein the at least three projections are snap-fit over the bottom lip of the groove associated with the window to secure the window to the case after assembling the window to the case; and wherein each one of the at least three window protrusions are positioned between two adjacent case protrusions to form a round front face to the first measuring device after assembling the window to the case.

11. A method for manufacturing a measuring device system comprising:

providing a case of a first measuring device that includes at least three projections and at least three case protrusions;

providing a window of the first measuring device that includes: (i) at least three clearance notches; (ii) at least three window protrusions; and (iii) a groove, wherein the groove further includes a bottom lip;

wherein the at least three clearance notches are configured and dimensioned to allow the at least three projections to bypass the at least three clearance notches when the at least three clearance notches are aligned with the at least three projections during assembly of the window to the case;

wherein the at least three projections are configured and dimensioned to snap-fit over the bottom lip of the groove associated with the window to secure the window to the case when the at least three clearance notches are not aligned with the at least three projections during assembly of the window to the case;

wherein the at least three window protrusions are configured and dimensioned to align with and rest against the at least three case protrusions and define at least three clearance regions around the front side of the measuring device when the at least three clearance notches are aligned with the at least three projections during assembly of the window to the case;

wherein the at least three window protrusions are configured and dimensioned to allow each one of the at least three window protrusions to be positioned between two adjacent case protrusions to form a round front face to the first measuring device when the at least three clearance notches are not aligned with the at least three projections during assembly of the window to the case;

providing a gasketing material sized to rest in the groove;

resting the gasketing material in the groove; and assembling the window to the case.

12. The method of claim 11, wherein the first measuring device is a pressure measuring device.

13. The method of claim 11, wherein the first measuring device is a temperature measuring device.

14. The method of claim 11, wherein the gasketing material is an O-ring, and wherein the O-ring forms a radial style seal between the window and the case after assembling the window to the case.

15. The method of claim 11, further comprising providing a removable ring that includes at least three mating structures; and wherein the at least three mating structures of the removable ring are releasably secured to the at least three case protrusions of the case to releasably secure the removable ring to the case and to seal the window between the removable ring and the case.

16. The method of claim 15, wherein the at least three mating structures are ramped mating structures.

17. The method of claim 11, wherein the window is a plastic molded window.

18. The method of claim 11, further comprising providing a retaining ring, and wherein the retaining ring is fixedly secured onto the case to seal the window between the retaining ring and the case.

19. The method of claim 18, wherein the retaining ring is fixedly secured onto the case by crimping or rolling the back end of the retaining ring over the case.

20. The method of claim 11, wherein the at least three projections are snap-fit over the bottom lip of the groove associated with the window to secure the window to the case after assembling the window to the case; and wherein each one of the at least three window protrusions are positioned between two adjacent case protrusions to form a round front face to the first measuring device after assembling the window to the case.

* * * * *